3,743,675
N-(PHENYL-CARBAMYL)-AMINO-BENZENE-SULFONYL FLUORIDES

Ludwig Konrad Huber, King of Prussia, Pa., assignor to Pennwalt Corporation, Philadelphia, Pa.
No Drawing. Filed July 10, 1972, Ser. No. 270,348
Int. Cl. C07c *143/70*
U.S. Cl. 260—543 P           8 Claims

ABSTRACT OF THE DISCLOSURE

Novel substituted N - (phenyl - carbamyl) - amino-benzene-sulfonyl fluorides having useful biological activity which has been demonstrated in inhibiting bacterial growth as well as fungal growth. These N-(phenyl-carbamyl)-amino-benzene-sulfonyl fluorides have the general formula:

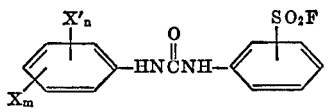

wherein X is chlorine, bromine, trifluoromethyl, methoxy or fluorosulfonyl; X' is hydrogen, chloride, bromines, trifluoromethyl, methoxy or fluorosulfonyl; $m$ is a whole number from 1 to 3, and $n$ is a whole number from 1 to 3.

---

This invention relates to novel substituted N-(phenyl-carbamyl)-amino-benzene-sulfonyl fluorides which are of interest because of their useful biological activity. The activity of these compounds has been demonstrated in inhibiting bacterial growth as well as fungal growth. In particular, this invention relates to N-(phenyl-carbamyl)-amino-benzene-sulfonyl fluorides having the general formula

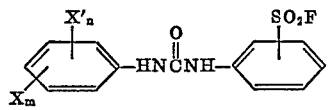

wherein X is chlorine, bromine, trifluoromethyl, methoxy or fluorosulfonyl; X' is hydrogen, chlorine, bromine, trifluoromethyl, methoxy or fluorosulfonyl; $m$ is a whole number from 1 to 3, and $n$ is a whole number from 1 to 3.

The following compounds are of particular interest:
N-(3,4-dichlorophenyl-carbamyl)-sulfanilyl fluoride,
N-(4-bromophenyl-carbamyl)-sulfanilyl fluoride,
N-(3-trifluoromethyl-4-chlorophenyl-carbamyl)-sulfanilyl fluoride,
N-(2,5-dichlorophenyl-carbamyl)-sulfanilyl fluoride.
N-(3-fluorosulfonyl-phenyl-carbamyl)-sulfanilyl fluoride, and N-(4-methoxy-phenyl-carbamyl)-sulfanily fluoride.

The compounds of invention can be prepared by various methods such as by reactions of appropriate isocyanates with appropriate amines, reactions of phosgene with appropriate amines, or reactions of appropriate ureas with fluorosulfonic or chlorosulfonic acid; in the latter case the intermediate sulfonyl chlorides are subsequently reacted with suitable fluorides (e.g. KHF$_2$) to form the products of this invention.

The novel compounds of this invention are colorless solids with solubilities in certain organic solvents, such as dimethyl formamide, dimethyl sulfoxide, ketones, while they are essentially insoluble in water, diethyl ether and chloroform.

Representative compounds exhibit high biological activities, in particular against various bacteria and fungi. Their potency makes them valuable for a variety of applications. Thus, the compounds of invention or compositions containing them can be included in and on clothing, plaster, ink, wallboard, paper, adhesives, body care products (e.g. shampoos, toothpaste, and deodorants and antiperspirant products such as soaps, creams, sprays and the like), synthetic detergents, cutting oils, polymeric materials, enbalming fluids, oil paints and latex paints, emulsion polishes for floor finishes, biocides for use in oil fields, wood and lumber, etc., to prevent the attack of various fungal, algal and bacterial pests.

EXAMPLE I

To a solution of 25.2 g. (0.135 M) of 3,4-dichlorophenyl isocyanate in 100 ml. of diethyl ether, a solution of 23.6 g. (0.135 M) of sulfanilyl fluoride in 150 ml. of diethyl ether was added within 20 minutes, followed by 0.2 g. of 1,4-diazabicyclo-2,2,2-octane as a catalyst. There was a slight exotherm and gradually increasing amounts of white solid precipitated. After heating under reflux for 1¼ hours, the slurry was stirred overnight (15 to 16 hours) at ambient temperature (20 to 22° C.). The solid was then filtered and dried under vacuum to yield 44 g. of product which melted at 244–47° C. Elemental analysis was in agreement with the assumed structure:

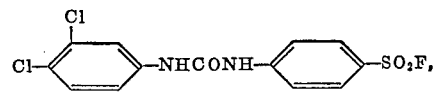

N-(3,4-dichlorophenyl-carbamyl)-sulfanilyl fluoride.

Calc'd for $C_{13}H_9Cl_2FN_2O_3S$ (percent): C, 42.99; H, 2.49; N, 7.72. Found (percent): C, 43.18; H, 2.61; N, 7.60.

In biostatic tests using the Agar Dilution method, the compound showed inhibiting effect against *Escherichia coli* and *Staphylococcus aureus* at concentrations at least as low as 10 p.p.m. and 0.3 p.p.m. respectively, and against *Aspergillus niger* and *Pullularia pullulans* at concentrations as low as 5 p.p.m. When formulated with 1% aqueous soap solutions of Ivory soap (Procter and Gamble) at a ratio of biocide: soap=1:100, the compound showed bacteriostatic effects against *Staphylococcus aureus* and *Escherichia coil* at 0.5 p.p.m. and 50 p.p.m., respectively.

AGAR DILUTION METHOD

The biostat is dissolved in an appropriate solvent (usually acetone) to obtain a stock solution with a concentration ten times the highest concentration to be tested. This stock solution is then diluted by mixing 3 ml. of the stock solution with 27 ml. of sterile nutrient agar. From this test concentrate, the other test concentration are made by diluting it directly (or some of the subsequent lower concentrations) with the required amounts of untreated agar. The test mixtures are then poured into Petri dishes to fill up on half of the area. The other half contains the untreated control agar. Both the treated and untreated agar are then seeded with bacteria or fungi by streaking across the plate. After an incubation time of 24–48 hours for the bacteria or 5–10 days for the fungi, the plates are examined for any inhibition properties of the biostat against the test organism.

The various test data are listed in the attached table. For comparison the commercial soap bacteriostat 3,4,4'-trichlorocarbanilide (TCC) is included as a standard. As is evident, the sulfonyl fluoride-containing compound of Example I is superior both in gram negative bacteriostatic activity (*E. coli*) and in fungistatic activity (*Aspergillus niger* and *Pullularia pullulans*).

To demonstrate the bacteriostatic activity of N-(3,4-dichlorophenyl-carbamyl)-sulfanilyl fluoride in the presence of soap, a 0.01% dispersion of biocide in 1% soap solution was used as stock solution (instead of the usual 1–0.01% solution in acetone) for preparing the biocide-containing test agars. The biocide soap solution was simply prepared by adding 2.0 ml. of a 1% solution of biocide in dimethyl formamide to 200 ml. of a 1% aqueous solution of Ivory soap (Procter and Gamble). During the addition, the mixture was well blended in a blender for obtaining a uniform dispersion.

EXAMPLE II

The procedure of Example I was repeated using 28.8 g. (0.12 M) of 4-bromophenyl isocyanate and 20.8 g. (0.12 M) of sulfanilyl fluoride to produce 40 g. of crude product. Upon repeated washing with chloroform at ambient temperature, 36 g. of insoluble white solid were obtained (M.P. 239–43° C.) which analyzed for N-(4-bromophenyl-carbamyl)-sulfanilyl fluoride.

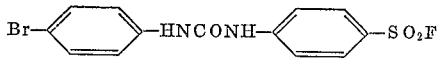

Calc'd for $C_{13}H_{10}BrFN_2O_3S$ (percent): C, 41.84; H, 2.58; N, 7.51. Found (percent): C, 41.98; H, 2.89; N, 7.65.

When tested against *Pullularia pullulans* and *Staphylococcus aureus*, the compound of this Example II showed activities about equal to the dichloro compound of Example I.

EXAMPLE III

The procedure of Example I was repeated, reacting 22.3 g. (0.1 M) of 3-trifluoromethyl-4-chlorophenyl-isocyanate and 17.5 g. (0.1 M) of sulfanilyl fluoride to produce 33 g. of solid which melted at 222–26° C. The analysis corresponded to the expected N-(3-trifluoromethyl-4-chlorophenylcarbamyl)-sulfanilyl fluoride:

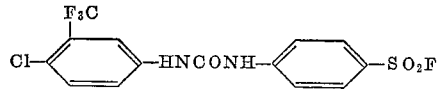

Calc'd for $C_{14}H_9ClF_4N_2O_3S$ (percent): C, 42.38; H, 2.29; N, 7.06. Found (percent): C, 42.41; H, 2.56; N, 7.24.

The compound of this Example III showed very high biostatic activity against *Pullularia pullulans* and *Aspergillus niger*, and particularly against *Staphylococcus aureus*.

EXAMPLE IV

By the procedure of Example I, 18.8 g. (0.1 M) of 2,5-dichlorophenyl-isocyanate were reacted with 16.7 g. (0.095 M) of sulfanilyl fluoride to produce 35 g. white solid which melted at 234° C. The analysis agreed with the assumed composition, N-(2,5-dichlorophenyl-carbamyl)-sulfanilyl fluoride:

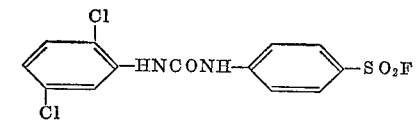

Calc'd for $C_{13}H_9Cl_2FN_2O_3S$ (percent): C, 42.99; H, 2.49; N, 7.72. Found (percent): C, 44.43; H, 3.41; N, 6.95.

Residual ether odor which persisted after extensive drying indicates the presence of coordinatively bonded ether. The compound showed biostatic activity against *Staphylococcus aureus* and *Pullularia pullulans* at 0.5 and 5 p.p.m., respectively.

EXAMPLE V

By the procedure of Example I, 18.5 g. (0.092 M) of m-fluorosulfonylphenyl isocyanate were reacted with 16.2 g. (0.092 M) of sulfanilyl fluoride to produce 30 g. of crude N - (3 - fluorosulfonyl-phenyl-carbamyl)-sulfanilyl fluoride (M.P. 204–215° C.) which was further purified by extracting 24 g. of the crude product with 90 g. of warm acetone (40° C.) and concentrating the extract to about 50 g. Upon addition of 75 g. of chlorofrom and cooling in ice, about 4.5 g. of solid product crystallized which melted at 211–216° C. and analyzed as follows:

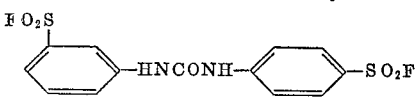

Calc'd for $C_{13}H_{10}F_2N_2O_5S_2$ (percent): C, 41.49; H, 2.68; F (Hydrolyzable), 10.10. Found (percent): C, 44.12; H, 3.69; F (Hydrolyzable), 8.21.

The product of this Example V showed high biostatic effects against *Staphylococcus aureus* and *Pullularia pullulans*.

EXAMPLE VI

To a solution of 12.6 g. (0.085 M) of p-methoxyphenylisocyanate in 100 ml. of diethyl ether, a solution of 14.8 g. (0.085 M) of sulfanilyl fluoride in 100 ml. of diethyl ether was added dropwise, followed by 0.2 g. of 1,4-diazabicyclo-2,2,2-octane. On stirring at ambient temperature for 2 hours, and at 35° C. for additional 2 hours, increasing amounts of white solid precipitated which were filtered to produce 4 g. of solid product (M.P. 235–240° C.). The mother liquor was stirred overnight after 0.2 g. more of said amine catalyst had been added. Filtration of the reaction mixture produced 10 g. of white solid which melted at 237–40° C. and analyzed for the expected N-(4-methoxy-phenyl-carbamyl)-sulfanilyl fluoride:

Calc'd for $C_{14}H_{13}FN_2O_4S$ (percent): C, 51.85; H, 4.04; S, 9.88. Found (percent): C, 52.13; H, 4.20; S, 9.95.

EXAMPLE VII

To a solution of 9.6 g. of m-fluorosulfonyl-phenyl-isocyanate in 100 ml. of diethyl ether, 0.2 g. of 1,4-diazabicyclo-2,2,2-octane was added, followed by dropwise addition of 7.6 g. of 3,4-dichloroaniline in 50 ml. of diethyl ether. Immediatetly, white solid started to precipitate. After stirring for 2 hours at ambient temperature, the reaction mixture was filtered to produce 11 g. of white solid product which melted at 195–200° C. and analyzed for the expected (N-(3,4-dichlorophenyl-carbamyl)-metanilyl fluoride:

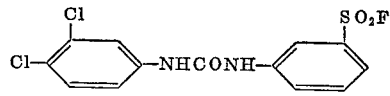

Calc'd for $C_{13}H_9Cl_2FN_2O_3S$ (percent): C, 42.99; H, 2.49. Found (percent): C, 42.91; H, 2.60.

In the table that follows, the legends:

0=No growth
±=Trace growth
1=Partial growth
2=Intermediate growth
3=Moderate growth
4=Heavy growth

What is claimed is:

1. Phenyl-carbamyl amino-benzene-sulfonyl fluorides having the general formula:

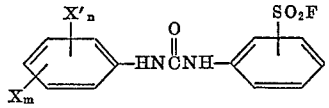

wherein X is chloro, bromo, trifluoromethyl, methoxy or fluorosulfonyl; X' is hydrogen, chloro, bromo, trifluoromethyl, methoxy or fluorosulfonyl; $m$ is a whole number from 1 to 3, and $n$ is a whole number from 1 to 3.

2. The compound of claim 1 wherein X is 3-chloro; X' is 4-chloro; $m$ is 1 and $n$ is 1 which is N-(3,4-dichlorophenyl-carbamyl)-sulfanilyl fluoride.

3. The compound of claim 1 wherein X is 4-bromo; X' is hydrogen; $m$ is 1 and $n$ is 1 which is N-(4-bromophenyl-carbamyl)-sulfanilyl fluoride.

4. The compound of claim 1 wherein X is 3-trifluoromethyl; X' is 4-chloro; $m$ is 1 and $n$ is 1 which is N-(3-trifluoromethyl-4-chlorophenyl-carbamyl)-sulfanilyl fluoride.

5. The compound of claim 1 wherein X is 2-chloro; X' is 5-chloro; $m$ is 1 and $n$ is 1 which is N-(2,5-dichlorophenyl-carbamyl)-sulfanilyl fluoride.

6. The compound of claim 1 wherein X is 3-fluorosulfonyl; X' is H; $m$ is 1 and $n$ is 1 which is N-(3-fluorosulfonyl-phenyl-carbamyl)-sulfanilyl fluoride.

7. The compound of claim 1 wherein X is 4-methoxy; X' is hydrogen; $m$ is 1 and $n$ is 1 which is N-(4-methoxyphenyl-carbamyl)-sulfanilyl fluoride.

8. The compound of claim 1 wherein X is 3-chloro; X' is 4-chloro; $m$ is 1 and $n$ is 1 which is N-(3,4-dichlorophenyl-carbamyl)-metanilyl fluoride.

References Cited

Baker et al., J. Med. Chem., vol. 11 (1968), pp. 241–245.

LORRAINE A. WEINBERGER, Primary Examiner

R. D. KELLY, Assistant Examiner

U.S. Cl. X.R.

424—315